US008100538B2

(12) United States Patent
Kuroda

(10) Patent No.: US 8,100,538 B2
(45) Date of Patent: Jan. 24, 2012

(54) ELECTRONIC DEVICE

(75) Inventor: Akitoshi Kuroda, Yamagata-mura (JP)

(73) Assignee: Seiko Epson Corporation, Tokyo (JP)

( * ) Notice: Subject to any disclaimer, the term of this patent is extended or adjusted under 35 U.S.C. 154(b) by 577 days.

(21) Appl. No.: 12/256,382

(22) Filed: Oct. 22, 2008

(65) Prior Publication Data

US 2009/0122280 A1    May 14, 2009

(30) Foreign Application Priority Data

Nov. 9, 2007   (JP) .................................. 2007-291473

(51) Int. Cl.
*G03B 21/14* (2006.01)
(52) U.S. Cl. ..................................... 353/70; 361/679.01
(58) Field of Classification Search .................... 353/70, 353/119; 248/222.14, 222.52, 222.12, 223.41, 248/222.51; 361/679.01
See application file for complete search history.

(56) References Cited

U.S. PATENT DOCUMENTS 6,869,052 B2 *  3/2005  Keast et al. ................. 248/188.9
7,420,747 B2 *  9/2008  Yoshikawa ................... 359/699

FOREIGN PATENT DOCUMENTS

| CN | 2862595 Y | 1/2007 |
|---|---|---|
| JP | 55-024937 U | 8/1978 |
| JP | 2000-29134 A | 1/2000 |
| JP | 2000-29139 A | 1/2000 |
| JP | 2002-156804 A | 5/2002 |
| JP | 2005-234307 A | 9/2005 |
| JP | 2006-330757 A | 12/2006 |
| WO | WO98-12601 A | 3/1998 |

* cited by examiner

Primary Examiner — Que T Le
Assistant Examiner — Jerry Brooks
(74) Attorney, Agent, or Firm — AdvantEdge Law Group, LLC

(57) ABSTRACT

An electronic device includes: a housing which accommodates a device main body; and a leg which contacts an installation surface on which the housing is installed and changes the projection length projecting from the outside surface of the housing. The leg has a leg main body contacting the installation surface, and a support member which projects from the outside surface of the housing and supports the leg main body. The support member has a base provided on the outside surface of the housing and a projecting portion projecting from the base and having a screw groove on the outer circumferential surface of the base. The leg main body has an insertion hole into which the projecting portion is inserted at one end of the leg main body, and a screw thread engaging with the screw groove on the inner circumferential surface of the insertion hole.

7 Claims, 9 Drawing Sheets

ELECTRONIC DEVICE

BACKGROUND

1. Technical Field

The present invention relates to an electronic device including a housing which accommodates a device main body, and a leg which contacts an installation surface on which the housing is installed and varies the projection length of the leg projecting from the outside surface of the housing.

2. Related Art

A projector which modulates light emitted from a light source according to image information by using a light modulation device and projects the modulated image light onto a screen or the like disposed before the projector is known.

According to this type of projector, the projected image is inclined when the installation surface installed is inclined.

Thus, such a technology has been proposed which changes the projection length of a leg projecting from a housing of the projector to change the posture condition of the projector and control the inclination of the projected image (for example, see JP-A-2005-234307).

According to the technology shown in JP-A-2005-234307, the housing constituting the outside case has a boss projecting toward the inside. This boss has a hole communicating with the inside and outside of the housing and having a screw thread on the inner circumferential surface. The leg has a screw groove engaging with the screw thread of the boss on the outer circumferential surface. In this structure, the leg rotates relative to the boss to change the projection length of the leg from the housing.

According to the technology shown in JP-A-2005-234307, however, a space for providing a boss and a space for inserting the leg into the housing through the boss are required inside the housing. In this case, other components cannot be disposed in these spaces, and thus effective use of the space inside the housing is difficult. Moreover, the necessity for providing the sufficient spaces discussed above inside the housing prevents size reduction of the projector.

SUMMARY

It is an advantage of some aspects of the invention to provide an electronic device capable of effectively using inside space of a housing and achieving size reduction.

An electronic device according to an aspect of the invention includes: a housing which accommodates a device main body; and a leg which contacts an installation surface on which the housing is installed and changes the projection length projecting from the outside surface of the housing. The leg has a leg main body contacting the installation surface, and a support member which projects from the outside surface of the housing and supports the leg main body. The support member has a base provided on the outside surface of the housing and a projecting portion projecting from the base and having a screw groove on the outer circumferential surface of the base. The leg main body has an insertion hole into which the projecting portion is inserted at one end of the leg main body, and a screw thread engaging with the screw groove on the inner circumferential surface of the insertion hole.

According to this structure, the leg included in the electronic device has the leg main body contacting the installation surface, and the support member which projects from the outside surface of the housing and supports the leg main body. The leg main body and the support member are engaged. The leg changes the projection length projecting from the outside surface of the housing by varying the engagement condition between the leg main body and the support member. In this structure, the leg is provided on the outside surface of the housing, and thus a space sufficient for disposing the leg is not needed inside the housing. This arrangement contributes to effective use of space inside space of the housing. Moreover, elimination of the space for the leg inside the housing reduces the sizes of the housing and the electronic device.

It is preferable that the support member is detachably attached to the housing.

According to this structure, the support member is detachably attached to the housing. In this case, the leg can be replaced when broken or for other reason. Thus, easiness of use can be enhanced.

It is preferable that both the base and the outside surface of the housing have contact surfaces contacting each other by respective surfaces when the support member is attached to the housing.

According to this structure, the base and the outside surface of the housing have the contact surfaces contacting each other by respective faces when the support member is attached to the housing. Thus, the housing can receive load given to the leg by the contact surface. In this case, concentrated load is not given to the housing, and thus breakage of the housing can be prevented.

It is preferable that the housing has an opening for attaching the support member. In this case, the support member as a substantially L-shaped component projecting from the base and bent at its end has an attachment protrusion inserted into the opening, and sandwiches the edge of the opening by the base and the attachment protrusion when the support member is shifted to an attachment position for attaching the support member to the housing with the attachment protrusion inserted into the opening.

According to this structure, the support member has the attachment protrusion which sandwiches the edge of the opening formed on the housing by the attachment protrusion and the base when the support member is shifted to the attachment position. In this case, the leg can be replaced from the outside of the housing without exposure of the interior of the housing. Thus, easiness of use can be further enhanced.

It is preferable that the housing has a stop portion at a position corresponding to the attachment position. In this case, the base has an engaging portion engaging with the stop portion when the support member shifts to the attachment position.

According to this structure, the housing and the base have the stop portion and the engaging portion, respectively, which engage with each other when the support member is shifted to the attachment position. In this case, the support member is not removed without releasing the engagement between the stop portion and the engaging portion. Thus, removal of the leg from the housing by the user can be prevented.

It is preferable that the projecting portion has a separation preventing hole which extends in the projection direction of the projecting portion from the end of the projecting portion, and has a step portion whose diameter on the end side is smaller than that on the base side. The leg main body as a substantially L-shaped component bent at its end projects from the insertion hole inner surface toward the support member, and has a separation preventing protrusion inserted into the separation preventing hole. The separation preventing protrusion engages with the step portion when the engagement between the support member and the leg main body is released with the separation preventing protrusion inserted into the separation preventing hole.

According to this structure, the leg main body has the separation preventing protrusion which engages with the step portion formed on the support member when the engagement between the screw thread and the screw groove of the support member is released by the rotation of the leg main body such that the projection length becomes longer. Thus, separation of the leg main body from the support member is prevented, and the possibility of losing the leg main body or the like can be reduced.

It is preferable that the electronic device is a projector which includes a light source, a light modulation device for modulating light emitted from the light source according to image information, and a projection device which enlarges and projects the light modulated by the light modulation device.

According to this structure, the projector having the leg described above provides the advantages discussed above, and controls inclination of a projected image.

BRIEF DESCRIPTION OF THE DRAWINGS

The invention will be described with reference to the accompanying drawings, wherein like numbers reference like elements.

DESCRIPTION OF EXEMPLARY EMBODIMENTS

An embodiment according to the invention is hereinafter described with reference to the drawings.
Main Structure of Projector FIG. 1 is a plan view schematically illustrating a general structure of a projector as an electronic device according to this embodiment.

The projector modulates light emitted from a light source according to image information and forms a color image (image light). Then, the projector enlarges and projects the color image on a screen (not shown) or the like.

Figure 1:
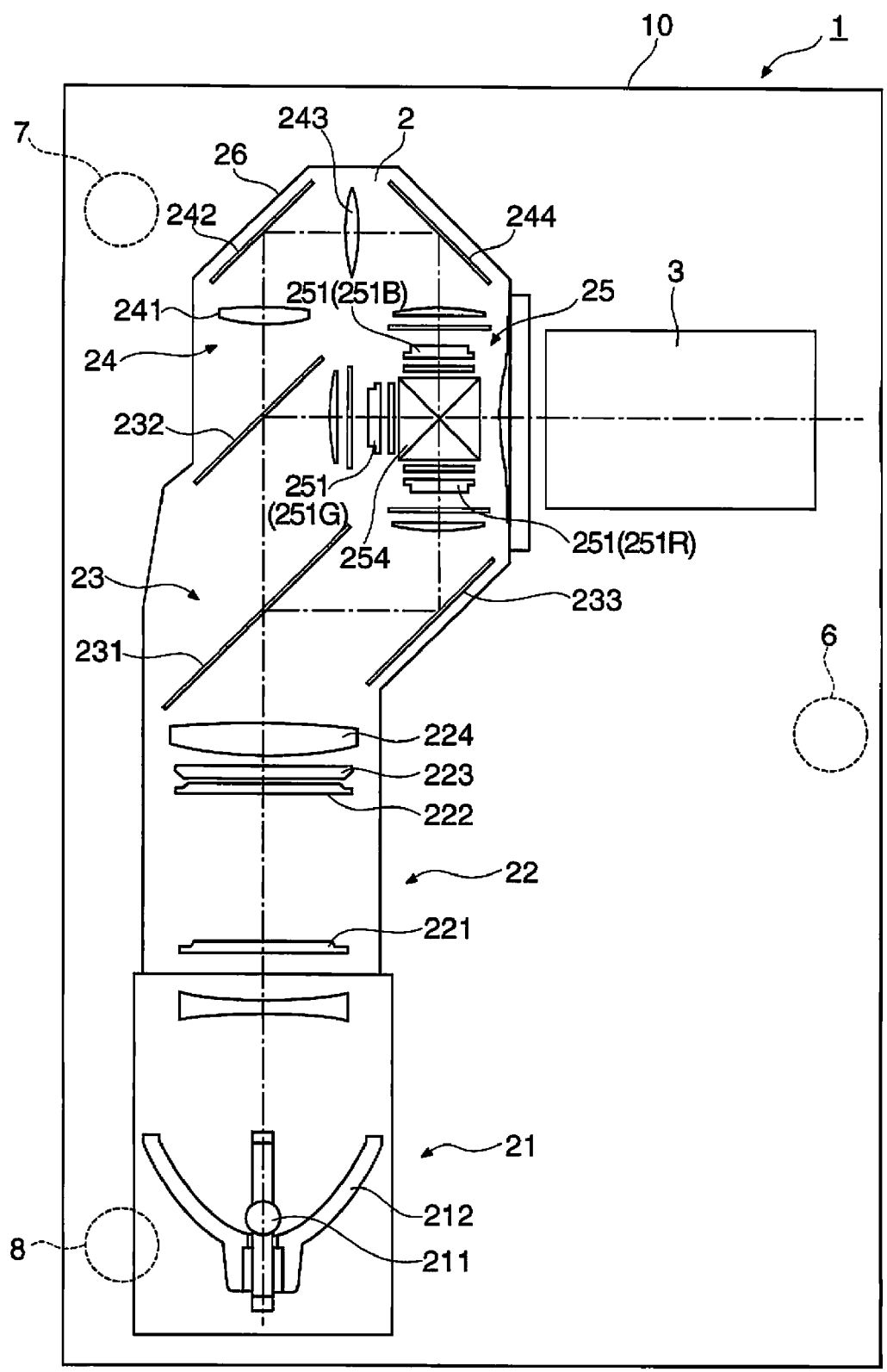
FIG. 1 is a plan view schematically illustrating a general structure of a projector according to an embodiment.

As illustrated in FIG. 1, a projector 1 includes an optical unit 2, a projection lens 3 as the projection device, a housing 10 for accommodating a device main body containing these components and for constituting the outside case, a front leg 6, a leg 7, and a fixed leg 8 and the like provided on the outer surface of the housing 10.

Though not specifically shown in the FIG. 1, a cooling unit provided with a cooling fan for cooling the respective components within the projector 1, a power supply unit for supplying electric power to the respective components within the projector 1, and a control device for controlling the respective components within the projector 1 are disposed in the space other than the spaces of the optical unit 2 and the projection lens 3 within the housing 10.

The optical unit 2 is a unit which processes light emitted from a light source 211 in an optical manner and forms a color image corresponding to image information under the control of the control device. The optical unit 2 has a light source device 21, an illumination device 22, a color separation device 23, a relay device 24, an optical device 25, and an optical component housing 26 on which these optical components 21 through 25 are disposed at predetermined positions.

The light source device 21 has the light source 211, a reflector 212, and others. The emission direction of the light emitted from the light source 211 is equalized by the reflector 212, and the light in the same direction is released toward the illumination device 22.

The illumination device 22 has a first lens array 221, a second lens array 222, a polarization conversion element 223, and a superimposing lens 224. The light emitted from the light source device 21 is divided into a plurality of partial lights by the first lens array 221, and forms an image in the vicinity of the second lens array 222. The respective partial lights released from the second lens array 222 enter an entrance surface of the polarization conversion element 223 such that the center axis (chief ray) of each partial light enters in the vertical direction to the entrance surface. Then, the partial lights are released from the polarization conversion element 223 as substantially one type of linear polarized lights. The plural partial lights released from the polarization conversion element 223 as linear polarized lights are superimposed on three liquid crystal panels 251 (to be described later) of the optical device 25 via the superimposing lens 224.

The color separation device 23 has two dichroic mirrors 231 and 232 and a reflection mirror 233, and has a function of separating the plural partial lights released from the illumination device 22 by these dichroic mirrors 231 and 232 and the reflection mirror 233 into lights in three colors of red, green and blue.

The relay device 24 has an entrance side lens 241, a relay lens 243, and reflection mirrors 242 and 244. The relay device 24 has a function of introducing the color lights such as red light separated by the color separation device 23 toward a red light side liquid crystal panel 251R (to be described later) of the optical device 25.

The optical device 25 has three liquid crystal panels 251 as light modulation units (red light side liquid crystal panel 251R, green light side liquid crystal panel 251G, and blue light side liquid crystal panel 251B), entrance side polarizer and exit side polarizer disposed on the corresponding surfaces of each of the liquid crystal panels 251, and a cross dichroic prism 254 as a color combining device. The liquid crystal panel 251 modulates the respective color lights entering through the entrance side polarizer according to the corresponding image information, and releases the modulated color lights toward the cross dichroic prism 254 through the exit side polarizer. The cross dichroic prism 254 forms a color image by combining the respective color lights each of which is modulated and released from the exit side polarizer, and supplies the color image to the projection lens 3.

The projection lens 3 is constituted by combination lenses formed by combining a plurality of lenses to enlarge and project the color image formed by the optical unit 2 on the screen.

Figure 2:
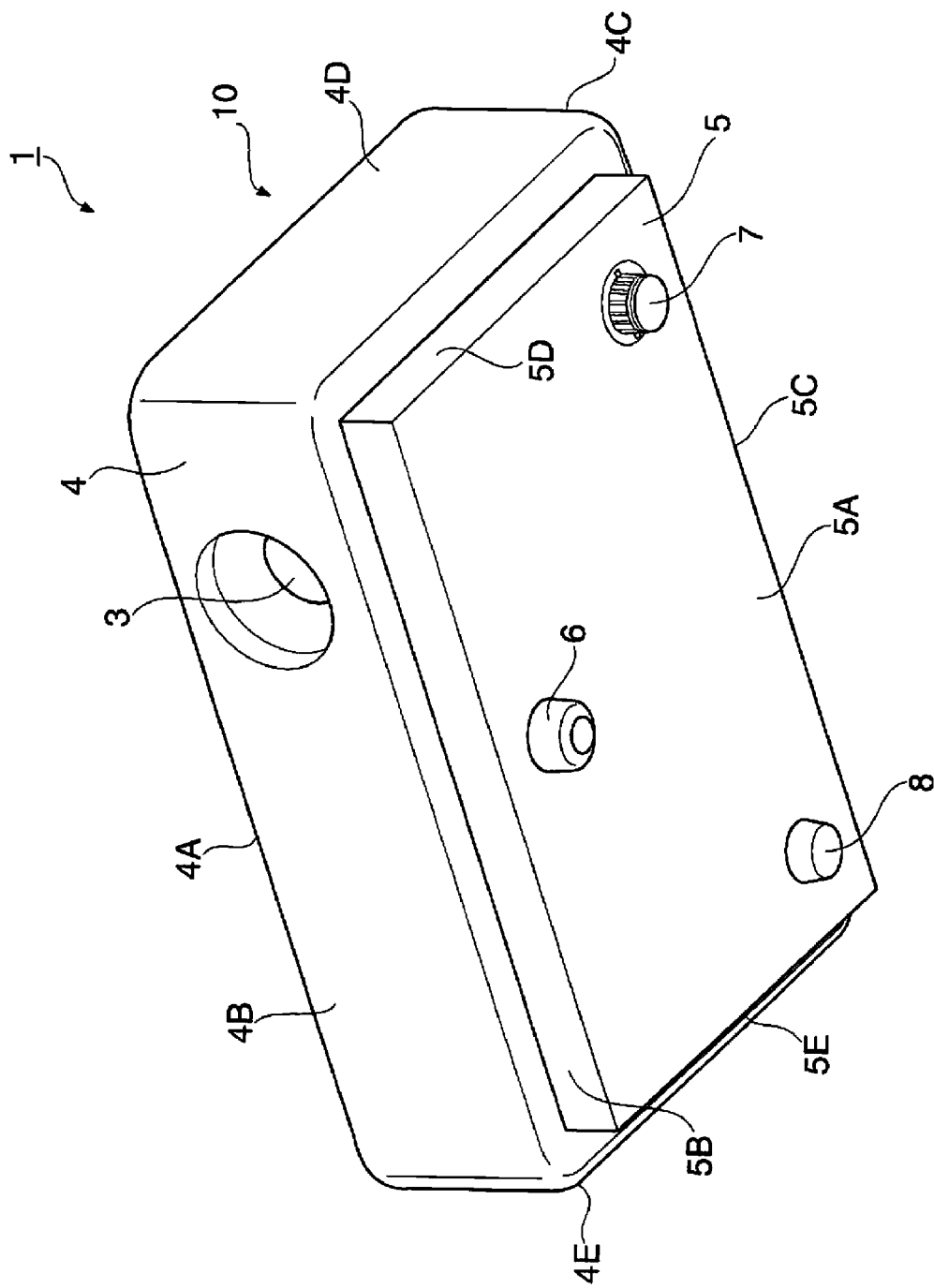
FIG. 2 is a perspective view of the projector according to the embodiment as viewed from the front bottom.

FIG. 2 is a perspective view of the projector 1 as viewed from the front bottom.

As illustrated in FIG. 2, the housing 10 includes an upper case 4 having a top surface 4A, a front surface 4B, a back surface 4C, and side surfaces 4D and 4E, a lower case 5 having a bottom surface 5A, a front surface 5B, a back surface 5C, and side surfaces 5D and 5E, and others. Each of the cases is fixed by screw or the like.

The front leg 6, the leg 7 and the fixed leg 8 contact the installation surface on which the projector 1 is installed to support the projector 1.

The front leg 6 is disposed substantially at the center in the front region of the bottom surface 5A of the lower case 5 in such a manner as to protrude from the outside face of the bottom surface 5A. Though not specifically shown in the figure, the front leg 6 can change its projection length from the outside face of the bottom surface 5A. The front leg 6 thus varies inclination of the projector 1 in the front-rear direction by changing the projection length so as to vary the height of the color image projected from the projection lens 3.

The leg 7 and the fixed leg 8 are disposed at the corresponding corners in the rear region of the bottom surface 5A in such a manner as to protrude from the outside face of the bottom surface 5A. Though not specifically shown in the figure, the leg 7 can change its projection length from the outside face of the bottom surface 5A similarly to the front leg 6. By changing the projection length of the leg 7, inclination of the projector 1 in the left-right direction orthogonal to the front-rear direction to control inclination of the color image projected from the projection lens 3. The leg 7 is detachably attached to the bottom surface 5A.

Detailed Structure of Leg

Figure 3:
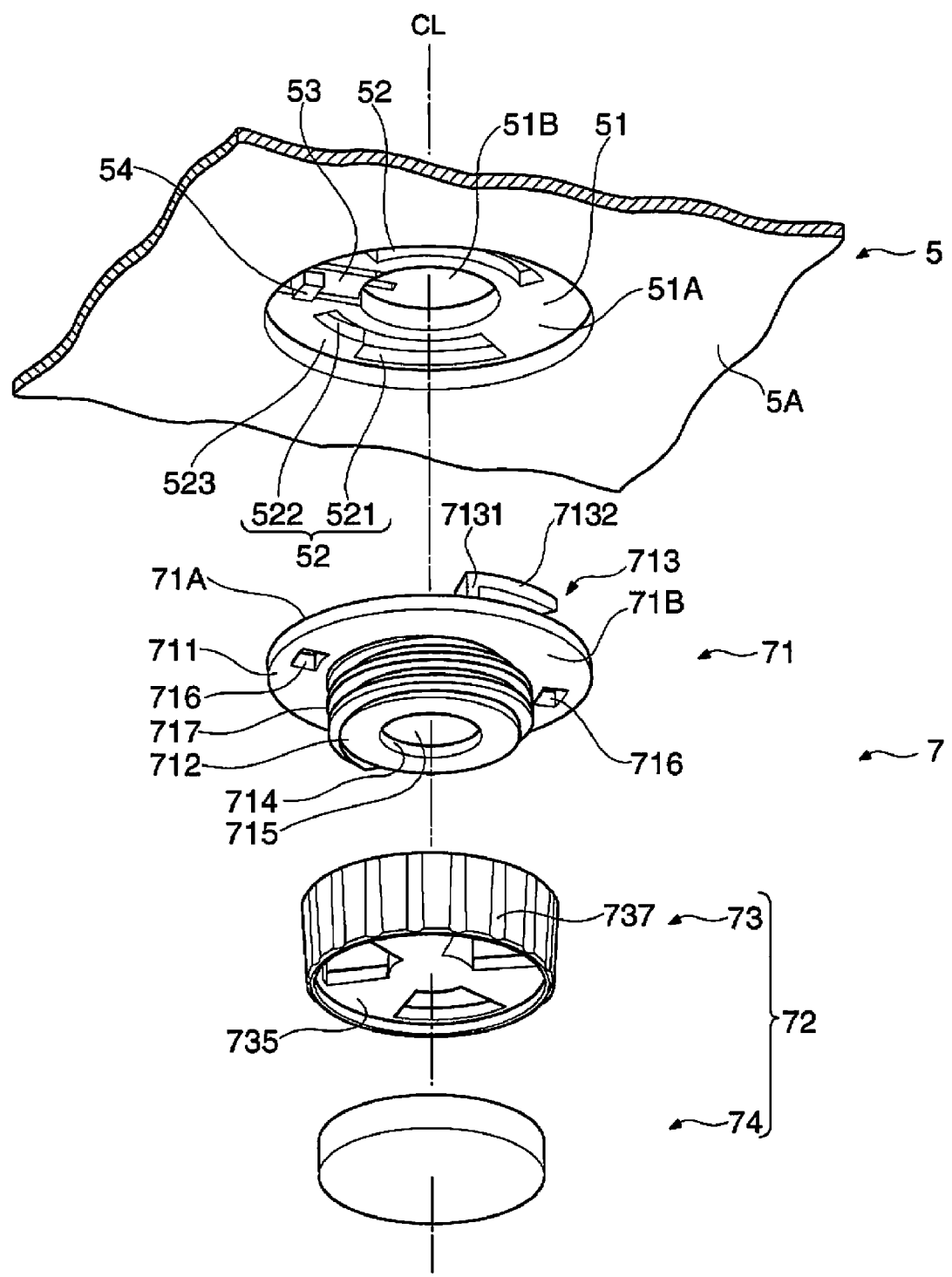
FIG. 3 is a perspective view illustrating a disassembled structure of a leg and a bottom surface to which the leg is attached.
Figure 4:
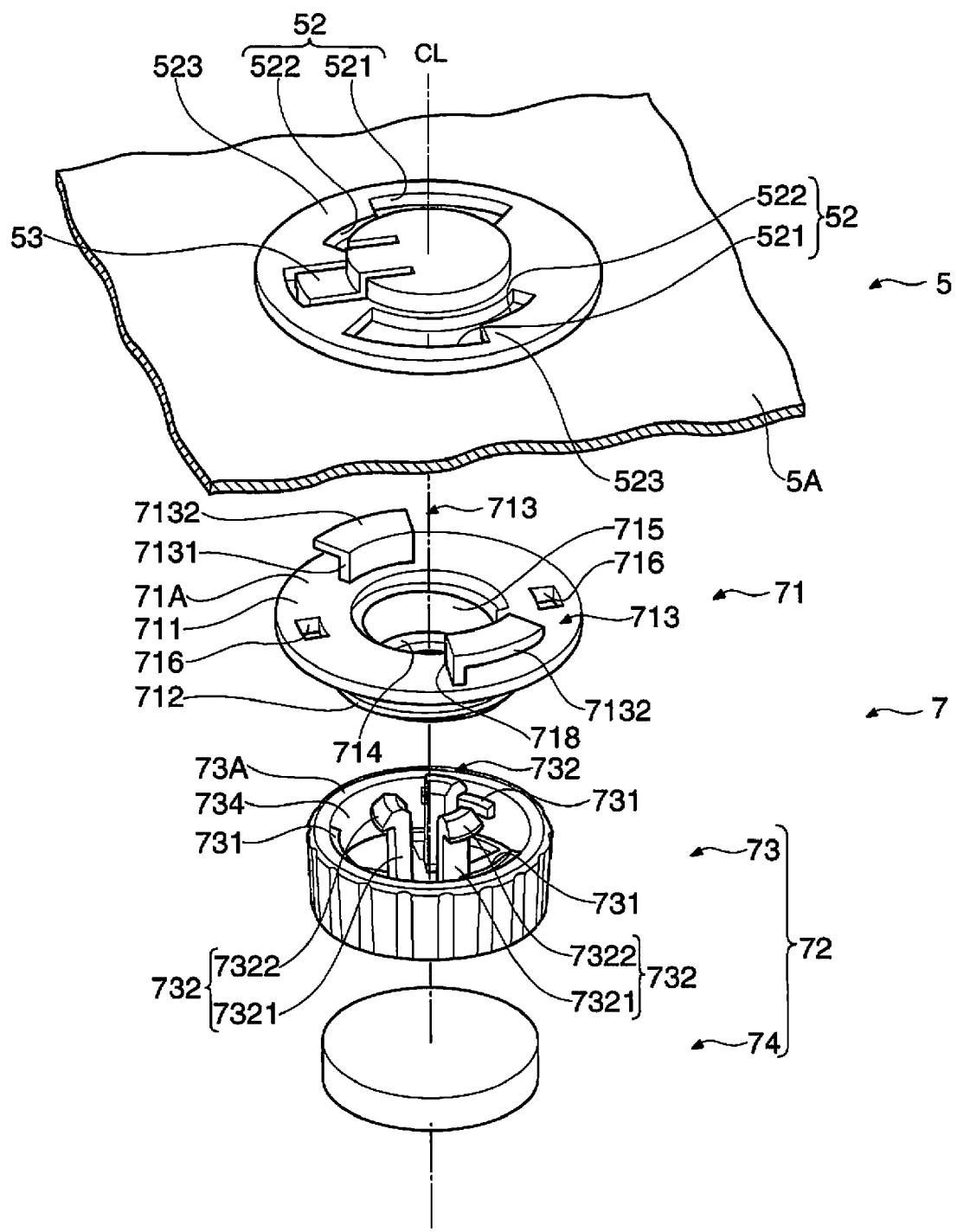
FIG. 4 is a perspective view illustrating a disassembled structure of the leg and the bottom surface to which the leg is attached.

FIGS. 3 and 4 are perspective view illustrating the disassembled structure of the leg 7 and the bottom surface 5A to which the leg 7 is attached. More specifically, FIG. 3 illustrates a condition as viewed from the outside of the bottom surface 5A. FIG. 4 illustrates a condition as viewed from the inside of the bottom surface 5A.

As illustrated in FIGS. 3 and 4, the bottom surface 5A has a concave 51 concaved toward the inside at a position corresponding to the position of the leg 7.

The concave 51 has a double-structure having the center portion further concaved toward the inside from the peripheral portion. These concaves have the same center and round shape in the plan view. The double-structure round faces as a face 51A positioned outside and a face 51B positioned at the center are flat faces substantially parallel with the outer surface of the bottom 5A.

The face 51A has two circular-arc openings 52 extending in the rotation direction around a center axis CL which passes the center of the face 51A and is substantially perpendicular to the face 51A.

Each of the openings 52 has a wide portion 521 and a narrow portion 522 whose width in the direction orthogonal to the extending direction is smaller than the wide portion 521. The narrow portion 522 connects the wide portion 521 in the vicinity of the center axis CL.

The two openings 52 are disposed rotation-symmetric by 180° with the center located on the center axis CL. An edge 523 is provided at the edge of the narrow portion 522 on the side opposite to the center axis CL.

The concave 51 has a flexible portion 53 cut in a U-shape from the face 51B to the face 51A. The end positioned on the face 51A side of the flexible portion 53 can bend in a direction substantially orthogonal to the face 51A (up-down direction) with the fulcrum located at the base end positioned on the face 51B side.

A protrusion 54 as a stop portion projecting from the outside is provided at the end of the flexible portion 53.

The leg 7 has a support member 71 and a leg main body 72.

The support member 71 is attached to the concave 51 to support the leg main body 72. The support member 71 has a base 711, a projecting portion 712, and attachment protrusions 713.

The base 711 has a circular plate body, and formed such that the center position is located approximately on the center axis CL when the support member 71 is attached to the concave 51. One face 71A of the base 711 is flat and contacts the face 51A by respective faces when the support member 71 is attached to the concave 51. Thus, the face 71A and the face 51A correspond to contact faces according to the invention.

The face 71A has two holes 716 as engaging portions for engaging with the protrusion 54 when the support member 71 is attached to the concave 51. The two holes 716 are located at rotation symmetry positions by 180° around the center axis CL.

The projecting portion 712 projects from the other face 71B of the base 711, and has a cylindrical shape having an axis substantially in correspondence with the center axis CL. A screw groove 717 is formed on the outer circumference of the projecting portion 712.

The projecting portion 712 has a separation preventing hole 715 which extends in the projection direction from the end through the base 711. The separation preventing hole 715 has a step portion 714 as a step-shaped component whose diameter on the end side is smaller than that on the base side.

Each of the two attachment protrusions 713 is inserted into the corresponding one of the two openings 52 when the support member 71 is attached to the concave 51. The attachment protrusion 713 projects from the face 71A and has a substantially L shape whose end is bent in the direction away from the center axis CL. The attachment protrusion 713 has a rising portion 7131 rising from the face 71A, and a transverse portion 7132 bent from the end of the rising portion 7131 in a direction substantially parallel with the face 71A. The rising portion 7131 and the transverse portion 7132 extend in the rotation direction around the center axis CL in correspondence with the openings 52, and have circular-arc shapes as viewed from a direction along the center axis CL.

The rising portion 7131 has a thickness slightly smaller than that of the narrow portion 522. The clearance between the transverse portion 7132 and the face 71A is slightly larger than the thickness of the edge 523. One end of the attachment protrusion 713 in the extending direction has a standing wall portion 718 which projects from the face 71A and connects the end of the rising portion 7131 and the end of the transverse portion 7132. The standing wall 718 has a function of reinforcing the rising portion 7131 and the transverse portion 7132. The other end of the attachment protrusion 713 in the extending direction is opened such that the edge 523 can pass therethrough when the support member 71 is attached to the concave 51.

The two attachment protrusions 713 are disposed at rotation symmetric positions by 180° around the center axis CL similarly to the two openings 52.

The leg main body 72 is attached to the support member 71 and contacts the installation surface when the projector 1 is installed on the installation surface. The leg main body 72 has a leg base 73 and a plate-shaped slip-prevention member 74.

The leg base 73 is a cylindrical component having an axis substantially in correspondence with the center axis CL when the leg 7 is attached to the concave 51.

One end of the leg base 73 has an insertion hole 734 concaved toward the other end to receive the projecting portion 712. An intermittent screw thread 731 engaging with the screw groove 717 is formed on the inner circumferential surface of the insertion hole 734. The screwing condition between the screw thread 731 and the screw groove 717 changes by rotation of the leg base 73 around the center axis CL with the projecting portion 712 inserted for advance and retreat along the center axis CL. The end surface of the circumferential portion of the insertion hole 734 of the leg base 73 is an end surface 73A.

Three separation preventing protrusions 732 projecting from the bottom of the insertion hole 734 toward one end of the leg base 73 are provided symmetric around the center axis CL in the leg base 73.

The separation preventing protrusions 732 are inserted into the separation preventing hole 715 when the leg base 73 is attached to the support member 71. Each of the separation preventing protrusions 732 has a substantially L shape whose end is bent in a direction away from the center axis CL. The separation preventing protrusion 732 has a rising portion 7321 rising from the bottom of the insertion hole 734, and a bent portion 7322 bent from the end of the rising portion 7321.

The separation preventing protrusion 732 is formed such that the length from the bottom of the insertion hole 734 to the bent portion 7322 is larger than the height from the bottom of the insertion hole 734 to the screw thread 731. Also, the separation preventing protrusion 732 is formed such that the length from the center axis CL to the end of the bent portion 7322 is larger than the length from the center axis CL to the step portion 714. In this structure, the separation preventing protrusion 732 prevents separation of the leg main body 72 from the support member 71 by contact between the bent portion 7322 and the step portion 714 when the engaging condition between the screw thread 731 and the screw groove 717 is released.

A hole is formed on the bottom of the insertion hole 734 at or around a position where the screw thread 731 and the bent portion 7322 overlap with each other as viewed in the direction of the center axis CL. In this structure, the screw thread 731 and the bent portion 7322 are easily produced.

An attachment concave 735 concaved toward the one end is formed on the other end of the leg base 73. The slip-prevention member 74 is bonded to the attachment concave 735.

A groove 737 is formed throughout the outer circumference of the leg base 73. By the presence of the groove 737, the user can easily rotate the leg main body 72 with little slip.

The slip-prevention member 74 is made of a material which reduces slip of rubber or the like, and fixed to the attachment concave 735 via adhesive. The slip-prevention member 74 has a function of installation unit which contacts the installation surface when the projector 1 is installed on the installation surface.

The condition in which the support member 71 is attached to the concave 51 is now discussed.

Figure 5:
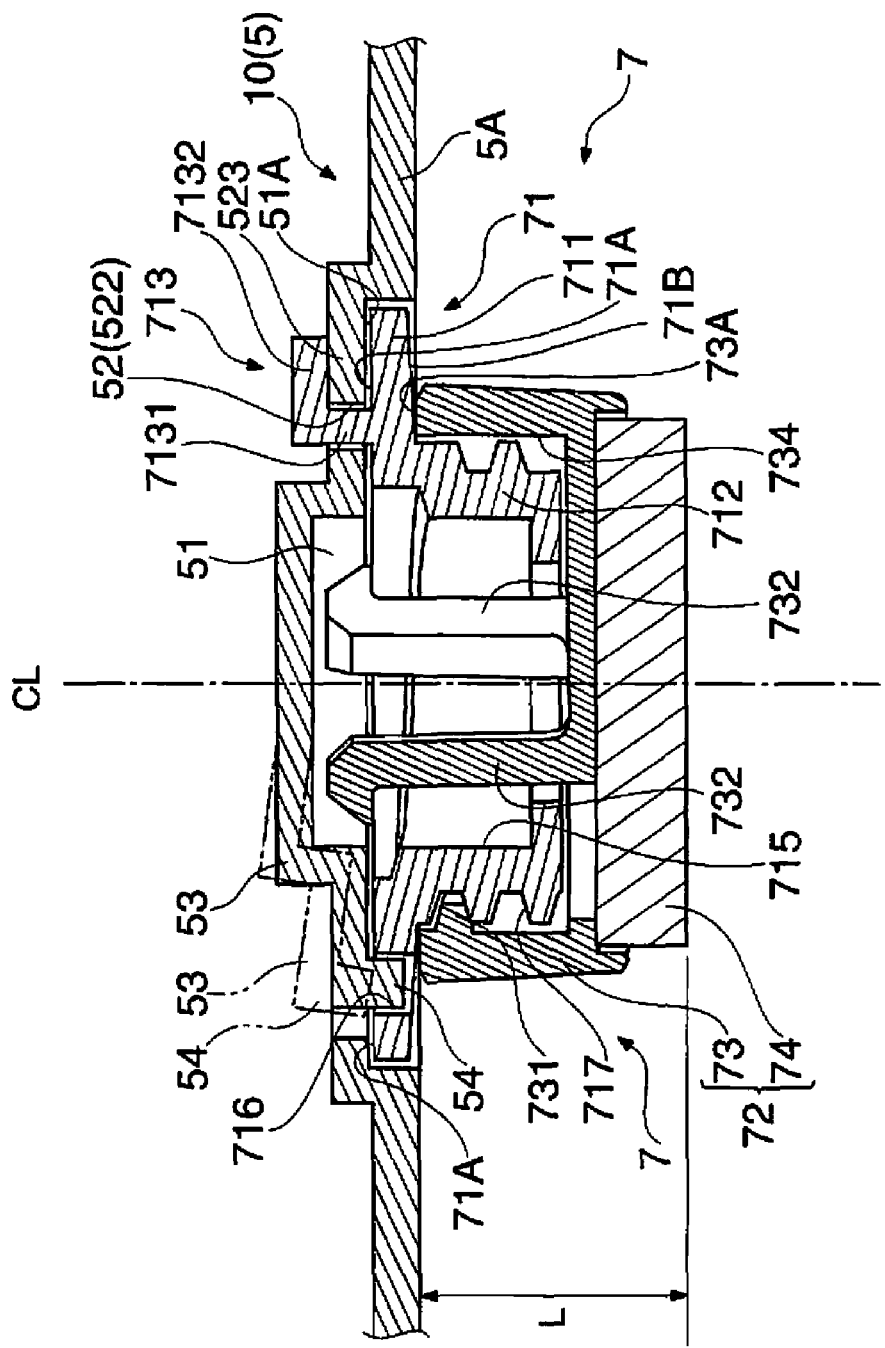
FIG. 5 is a cross-sectional view showing a condition where a support member is attached to a concave according to the embodiment.

FIG. 5 is a cross-sectional view illustrating the condition where the support member 71 is attached to the concave 51. In this figure, the projection length of the leg 7 is the shortest.

The support member 71 rotates around the center axis CL relative to the lower case 5 by inserting the two attachment protrusions 713 into the corresponding wide portions 521 (see FIG. 4) for achieving face-contact between the face 71A and the face 51A. In this condition, the end of the protrusion 54 of the flexible portion 53 contacts the face 71A of the support member 71 such that the flexible portion 53 is bent toward the inside of the lower case 5 (indicated by two-dot chain line in FIG. 5).

When the support member 71 in this condition is rotated around the center axis CL, the rising portion 7131 is inserted from the wide portion 521 to the narrow portion 522. In this condition, the base 711 and the transverse portion 7132 sandwich the edge 523. When the support member 71 is further rotated, the sandwiching range of the edge 523 gradually increases. When the hole 716 shifts to the position of engaging with the protrusion 54, the bending of the flexible portion 53 is released and returned to the original condition. As a result, the protrusion 54 engages with the hole 716, and thus the support member 71 is attached to the concave 51 as illustrated in FIG. 5. Accordingly, the protrusion 54 and the hole 716 are disposed at positions corresponding to the attachment positions for attaching the support member 71 to the concave 51.

The method of removal of the support member 71 from the concave 51 is now discussed.

When the protrusion 54 is pushed up toward the inner surface of the lower case 5, the flexible portion 53 is bent (indicated by the two-dot chain line in FIG. 5). In this condition, the engagement between the support member 71 and the hole 716 is released, and the support member 71 can be rotated. When the support member 71 is rotated in the direction opposite to the direction for attaching the support member 71 under release of the engagement between the protrusion 54 and the hole 716, the range of sandwiching the edge 523 by the base 711 and the transverse portion 7132 gradually decreases. When the rising portion 7131 shifts from the narrow portion 522 to the wide portion 521, the range for sandwiching the edge 523 by the transverse portion 7132 and the base 711 disappears. Thus, the support member 71 is removed from the concave 51.

The operation for changing the projection length of the leg 7 attached to the lower case 5 is now discussed.

In the condition shown in FIG. 5, the end surface 73A of the leg base 73 contacts the face 71B of the support member 71, and the projection length L from the outside face of the bottom surface 5A to the end of the slip-prevention member 74 is the shortest.

Figure 6:
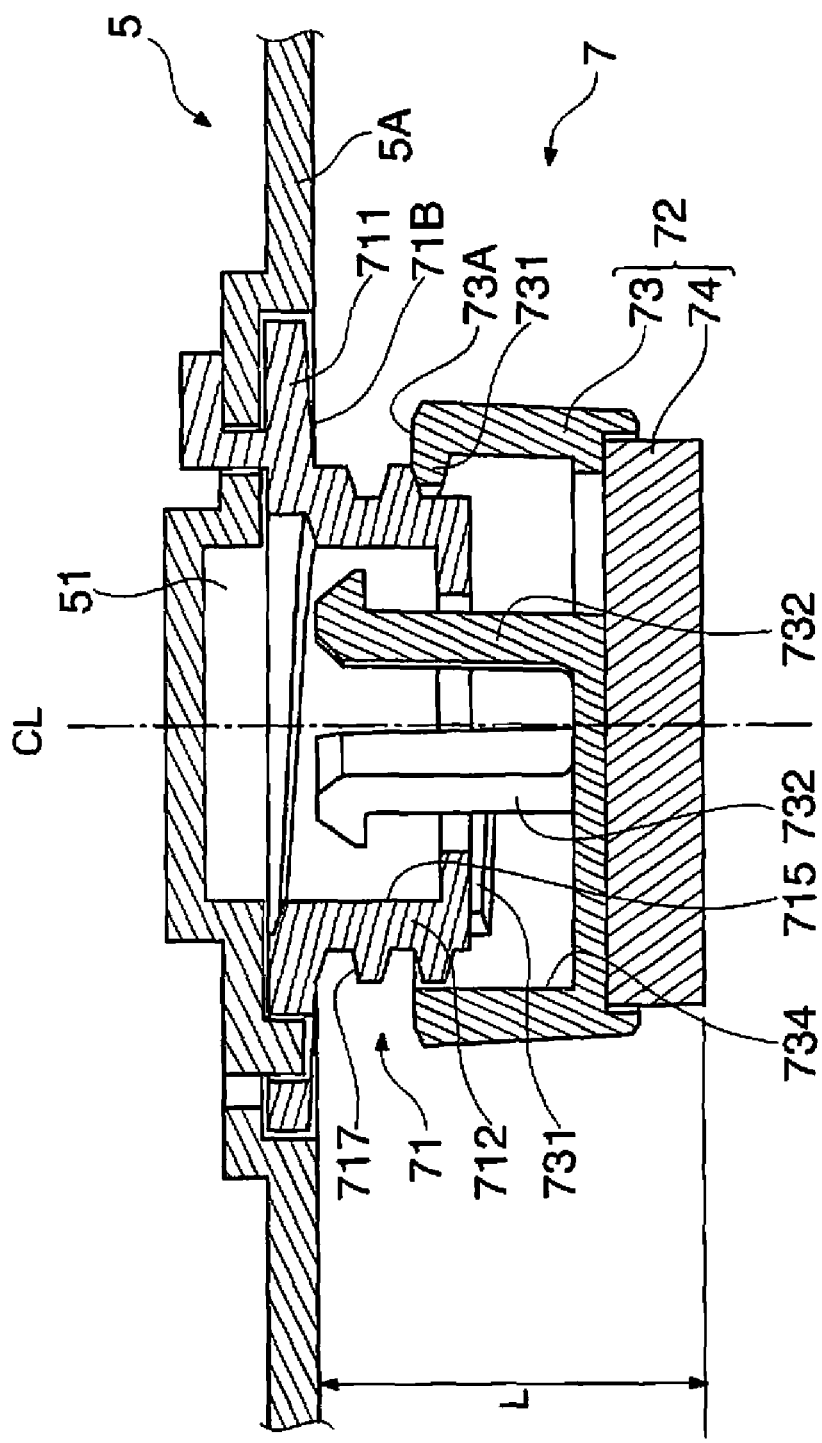
FIG. 6 is a cross-sectional view showing a condition where the leg is attached to a lower case according to the embodiment.

FIG. 6 is a cross-sectional view of the leg 7 attached to the lower case 5, illustrating the condition where the projection length L is longer than that of the leg 7 shown in FIG. 5.

When the leg main body 72 shown in FIG. 5 is rotated around the center axis CL relative to the support member 71 as illustrated in FIG. 6, the leg main body 72 shifts such that the end surface 73A moves away from the face 71B. In this case, the projection length L is longer than the projection length L shown in FIG. 5. When the leg main body 72 is rotated in the opposite direction, the projection length L is shortened. Thus, the leg main body 72 advances and retreats by its rotation relative to the support member 71, and changes the projection length L.

Control of inclination of the projected image by changing the projection length L of the leg 7 when the projector 1 is installed on the installation surface inclined in the left-right direction is now discussed.

Figure 7B:
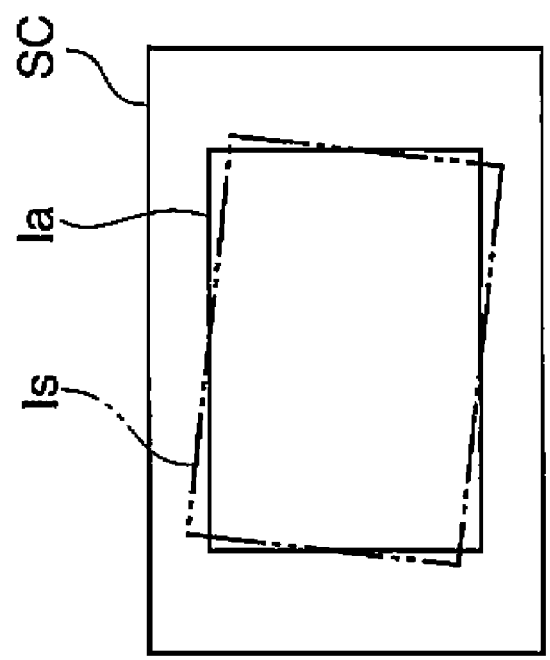
FIGS. 7A and 7B illustrate projection by a projector installed on an installation surface inclined higher on the leg side than on the fixed leg side.
Figure 7A:
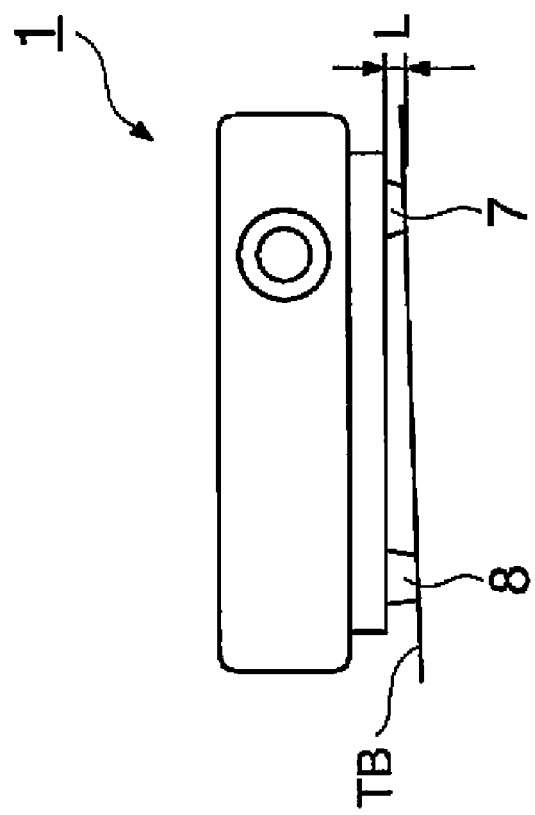

FIGS. 7A and 7B illustrate projection by the projector 1 installed on an installation surface TB inclined higher on the leg 7 side than on the fixed leg 8 side. FIG. 7A illustrates an external appearance of the projector 1 as viewed from the front, FIG. 7B shows an image projected on the screen SC positioned before the projector 1 in the posture shown in FIG. 7A as viewed from the projector 1.

Figure 8A:
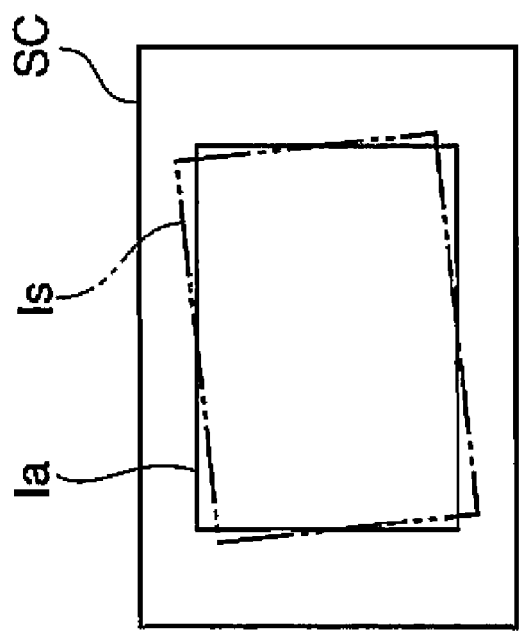
FIGS. 8A and 8B illustrate projection by a projector installed on an installation surface inclined lower on the leg side than on the fixed leg side.
Figure 8B:
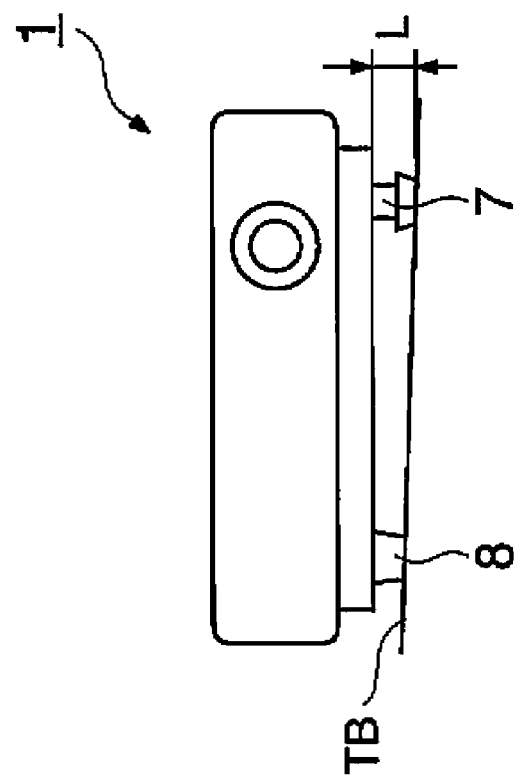

FIGS. 8A and 8B illustrate projection by the projector 1 installed on an installation surface TB inclined lower on the leg 7 side than on the fixed leg 8 side. FIG. 8A illustrates an external appearance of the projector 1 as viewed from the front, and FIG. 8B shows an image projected on the screen SC positioned before the projector 1 in the posture shown in FIG. 8A as viewed from the projector 1. FIGS. 7A, 7B and 8A, 8B do not show the front leg 6.

When the projector 1 is installed on the installation surface TB inclined higher on the leg 7 side than on the fixed leg 8 side with the same projection length L of the leg 7 and the fixed leg 8, the projector 1 is inclined similarly to the installation surface TB. In this case, an image Is projected on the screen SC is inclined such that the portion corresponding to the leg 7 is higher than the portion corresponding to the fixed leg 8 as illustrated in FIG. 7B. When the projection length L of the leg 7 is shortened such that the projector 1 is horizontally positioned as illustrated in FIG. 7A, the direction of the inclined image Is is controlled such that a horizontal image Ia with no inclination is produced.

When the projector 1 is installed on the installation surface TB inclined lower on the leg 7 side than on the fixed leg 8 side with the same length L of the leg 7 and the fixed leg 8, the projector 1 is inclined similarly to the installation surface TB. In this case, an image Is projected on the screen is inclined such that the portion corresponding to the leg 7 is lower than the portion corresponding to the fixed leg 8 as illustrated in FIG. 8B. When the projection length L of the leg 7 is increased such that the projector 1 is horizontally positioned as illustrated in FIG. 8A, the direction of the inclined image Is is controlled such that the horizontal image Ia with no inclination is produced.

The condition of the leg 7 having the longest projection length L is now described.

Figure 9:
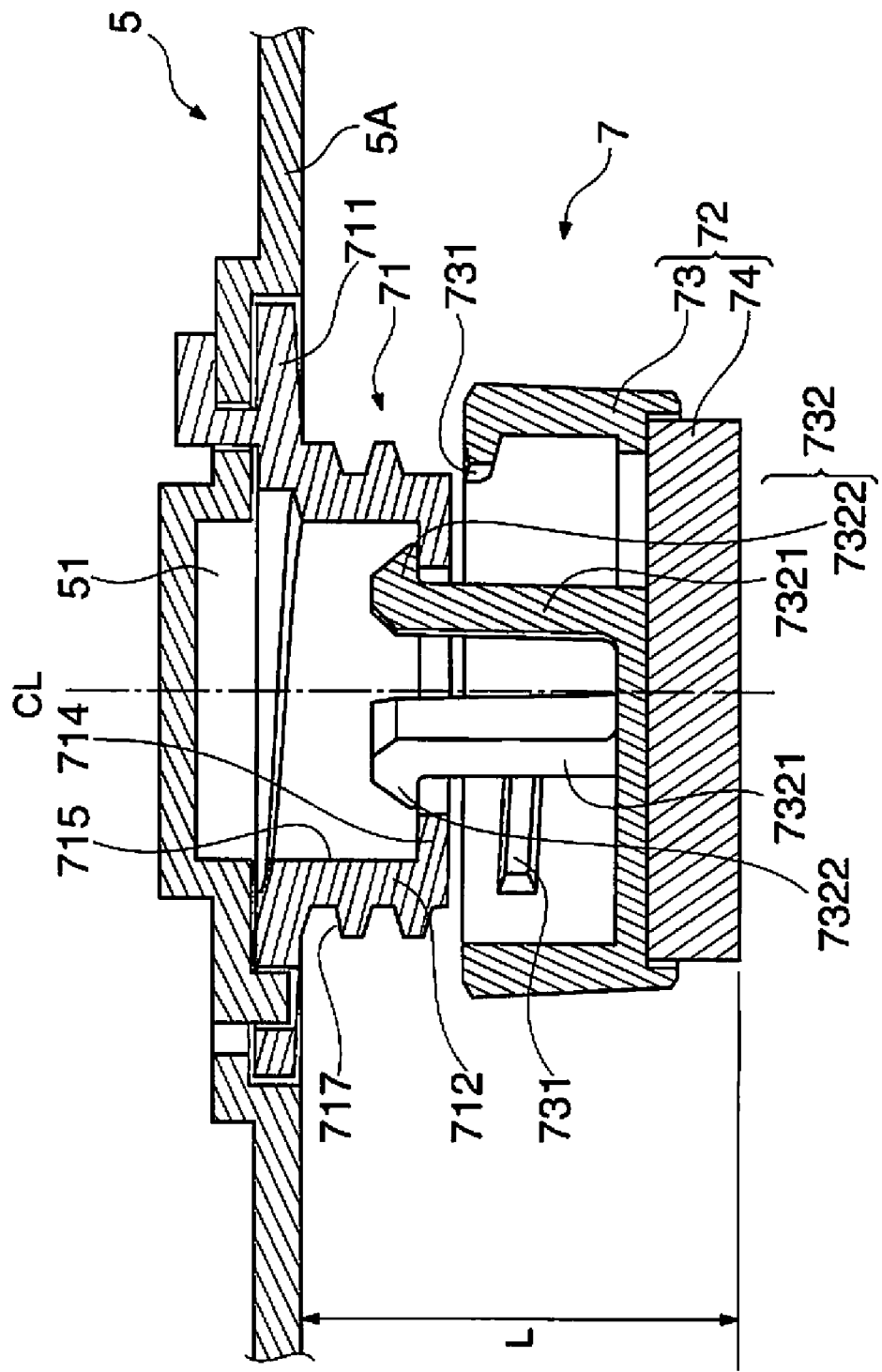
FIG. 9 is a cross-sectional view of the leg attached to the lower case in the embodiment.

FIG. 9 is a cross-sectional view of the leg 7 attached to the lower case 5, illustrating the condition in which the projection length L of the leg 7 is the longest.

As illustrated in FIG. 9, the engagement between the screw thread 731 and the screw groove 717 is released at a predetermined position as the projection length L increases by the rotation of the leg main body 72. According to the leg main body 72 located at this position, the three bent portions 7322 engage with the step portion 714, and rotate separately from the support member 71. Thus, the leg main body 72 does not disengage from the support member 71 during continuous rotation of the leg main body 72.

The projector 1 according to this embodiment provides the following advantages.

(1) The projector 1 includes the leg 7 which has the leg main body 72 contacting the installation surface TB and the support member 71 disposed on the outside surface of the lower case 5 to support the leg main body 72. The leg 7 changes the projection length L projecting from the outside surface of the lower case 5 by varying the engagement condition between the leg main body 72 and the support member 71. In this structure, the leg 7 is provided on the outside surface of the lower case 5 and does not enter the inside of the housing 10. Accordingly, a space for disposing the leg 7 is not needed inside the housing 10, which contributes to effective use of space. Moreover, elimination of the space for the leg 7 inside the housing 10 reduces the size of the housing 10 and the size of the projector 1.

(2) According to the leg 7, the support member 71 is detachably attached to the lower case 5, the leg 7 can be replaced when the leg 7 is broken or for other reason. Thus, easiness of use can be enhanced.

(3) The base 711 and the concave 51 have the faces 71A and 51A contacting each other by the respective faces, respectively, when the support member 71 is attached to the lower case 5. Thus, the lower case 5 can receive load given to the leg 7 by the face 51A. In this case, concentrated load is not given to the lower case 5, and thus breakage of the lower case 5 can be prevented.

(4) The support member 71 is inserted through the openings 52, and shifted to the attachment position. In this condition, the edge 523 is sandwiched by the base 711 and the attachment protrusion 713. In this case, the leg 7 can be replaced from the outside surface of the housing 10 without exposure of the interior of the housing 10 by removing screws or the like. Thus, easiness of use can be further enhanced.

(5) The lower case 5 and the base 711 have the protrusion 54 and the hole 716, respectively, which engage with each other when the support member 71 is shifted to the attachment position. In this case, the support member 71 is not removed without releasing the engagement between the protrusion 54 and the hole 716. Thus, removal of the leg 7 from the lower case 5 by the user can be prevented.

(6) The leg main body 72 has the separation preventing protrusions 732 which engage with the step portion 714 when the engagement between the screw thread 731 and the screw groove 717 is released by the rotation of the leg main body 72 such that the projection length L becomes longer. Thus, separation of the leg main body 72 from the support member 71 is prevented, and the possibility of losing the leg main body 72 or the like can be reduced.

Modification of Embodiment

The invention is not limited to the embodiment described herein, and it is thus intended that modifications and changes may be made as long as advantages of some aspects of the invention can be offered.

The support member 71 in this embodiment may be formed integrally with the lower case 5.

According to the embodiment, the support member 71 is attached by the shift of rotation relative to the lower case 5. However, the support member 71 can be attached by shift such as sliding substantially parallel with the outside face of the bottom surface 5A of the lower case 5 other than the shift by rotation.

The leg 7 and the fixed leg 8 in this embodiment may be provided either on the left and right sides. Alternatively, the leg 7 may be provided instead of the fixed leg 8 such that the left and right legs 7 control the inclination of the projector 1. While the leg 7 is disposed in the rear region in this embodiment, the leg 7 may be disposed in the front region. In this case, it is preferable that only one leg is disposed in the rear region substantially at the center in the left-right direction.

While the slip-prevention member 74 has a flat side for contacting the installation surface TB, the slip-prevention member may be a substantially spherical component. Moreover, while the slip-prevention member 74 of the leg main body 72 is attached to the leg base 73 by adhesive, the slip-prevention member 74 may be attached by other method. Also, the leg base 73 and the slip-prevention member 74 of the leg main body 72 may be formed integrally with each other.

While the outside shape of the leg base 73 is cylindrical in this embodiment, the leg base 73 may have other shapes such as surface containing concave and convex for preferable appearance in design.

While the projector has been discussed as an example of the electronic device, the invention is applicable to other electronic device capable of controlling inclination such as TV.

While a transmission type liquid crystal panel 251 is included in the optical device 25 in this embodiment, units such as the reflection type liquid crystal panel and micromirror device may be used.

According to the technology of the invention, effective use of spaces inside the housing and size reduction of the device can be achieved. Thus, the technology of the invention is appropriate for a projector used for various purposes such as presentation in corporations and home movie theaters.

The entire disclosure of Japanese Patent Application No. 2007-291473, filed Nov. 9, 2007 is expressly incorporated by reference herein.

What is claimed is:

1. An electronic device, comprising:
a device main body;
a housing which accommodates the device main body; and
a leg configured to contact an installation surface on which the housing is installed and change the projection length projecting from the outside surface of the housing, wherein
  the leg includes a leg main body configured to contact the installation surface, and a support member configured to project from the outside surface of the housing and support the leg main body,
  the support member includes a base provided on the outside surface of the housing and a projecting portion projecting from the base and having a screw groove on the outer circumferential surface of the base,
  the projecting portion includes a separation preventing hole which extends in the projection direction of the projecting portion from the end of the projecting portion, and includes a step portion whose diameter on the end side is smaller than that on the base side,
  the leg main body includes an insertion hole into which the projecting portion is inserted at one end of the leg main body, and a screw thread engaging with the screw groove on the inner circumferential surface of the insertion hole,
  the leg main body as a substantially L-shaped component bent at its end projects from the insertion hole inner surface toward the support member, and has a separation preventing protrusion inserted into the separation preventing hole; and
  the separation preventing protrusion engages with the step portion when the engagement between the support member and the leg main body is released with the separation preventing protrusion inserted into the separation preventing hole.

2. The electronic device according to claim 1, wherein the support member is detachably attached to the housing.

3. The electronic device according to claim 2, wherein both the base and the outside surface of the housing include contact surfaces contacting each other by respective surfaces when the support member is attached to the housing.

4. The electronic device according to claim 2, wherein:
the housing includes an opening for attaching the support member;
the support member as a substantially L-shaped component projecting from the base and bent at its end includes an attachment protrusion inserted into the opening, and sandwiches the edge of the opening by the base and the attachment protrusion when the support member is shifted to an attachment position for attaching the support member to the housing with the attachment protrusion inserted into the opening.

5. The electronic device according to claim 4, wherein:
the housing includes a stop portion at a position corresponding to the attachment position; and
the base has an engaging portion engaging with the stop portion when the support member shifts to the attachment position.

6. The electronic device according to claim 1, wherein the electronic device is a projector which includes a light source, a light modulation device for modulating light emitted from the light source according to image information, and a projection device which enlarges and projects the light modulated by the light modulation device.

7. An electronic device, comprising:
a device main body;
a housing which accommodates the device main body; and
a leg configured to contact an installation surface on which the housing is installed and change the projection length projecting from the outside surface of the housing, wherein
  the leg includes a leg main body configured to contact the installation surface, and a support member configured to project from the outside surface of the housing and support the leg main body, the support member being detachably attached to the housing,
  the support member includes a base provided on the outside surface of the housing and a projecting portion projecting from the base and having a screw groove on the outer circumferential surface of the base,
  the housing includes an opening for attaching the support member;
  the support member as a substantially L-shaped component projecting from the base and bent at its end includes an attachment protrusion inserted into the opening, and sandwiches the edge of the opening by the base and the attachment protrusion when the support member is shifted to an attachment position for attaching the support member to the housing with the attachment protrusion inserted into the opening, and
  the leg main body includes an insertion hole into which the projecting portion is inserted at one end of the leg main body, and a screw thread engaging with the screw groove on the inner circumferential surface of the insertion hole.

* * * * *